United States Patent
Kokura

(10) Patent No.: US 12,555,199 B2
(45) Date of Patent: Feb. 17, 2026

(54) IMAGE PROCESSING APPARATUS, IMAGE PROCESSING METHOD, AND STORAGE MEDIUM, WITH SYNTHESIS OF TWO INFERENCE RESULTS ABOUT AN IDENTICAL FRAME AND WITH INITIALIZING OF RECURRENT INFORMATION

(71) Applicant: CANON KABUSHIKI KAISHA, Tokyo (JP)

(72) Inventor: Toru Kokura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 18/480,768

(22) Filed: Oct. 4, 2023

(65) Prior Publication Data
US 2024/0144432 A1    May 2, 2024

(30) Foreign Application Priority Data

Oct. 27, 2022 (JP) .................................. 2022-172695

(51) Int. Cl.
*G06T 5/60* (2024.01)
*G06T 5/50* (2006.01)

(52) U.S. Cl.
CPC .................. *G06T 5/60* (2024.01); *G06T 5/50* (2013.01); *G06T 2207/20084* (2013.01)

(58) Field of Classification Search
CPC .... G06T 5/60; G06T 5/50; G06T 2207/20084
See application file for complete search history.

(56) References Cited

FOREIGN PATENT DOCUMENTS

JP    7007000 B1 * 1/2022 ............... H04N 7/01

OTHER PUBLICATIONS

JP 7007000 B1 Foreign Translation from IP.com (Year: 2022).*
Sajjadi, Mehdi S. M, et al. "Frame-Recurrent Video Super-Resolution" ArXiv.org, 2018, arxiv.org/abs/1801.04590. (Year: 2018).*

* cited by examiner

*Primary Examiner* — Siamak Harandi
*Assistant Examiner* — Jaspreet Kaur
(74) *Attorney, Agent, or Firm* — Venable LLP

(57) ABSTRACT

In the present disclosure, an appropriate inference is made using a recurrent-type neural network in image restoration processing. An input-image-acquisition unit acquires input image data. A learning-parameter-acquisition unit acquires a learning parameter to learn an image restoration network. An initialization determination unit acquires learning-sequence-length-information from the learning parameter and generates initialization information specifying a frame where two degradation restoration units perform initialization. Each degradation restoration unit receives one frame (current frame) of the input image data, sees the initialization information, determines whether to initialize recurrent information in a current frame inference, makes an inference about the current frame using initial image data or an inference result about a preceding frame immediately before the current frame as recurrent information, and outputs the inference result to a synthesis unit and the degradation restoration unit itself. The synthesis unit synthesizes two inference results about the same frame from the two degradation restoration units.

17 Claims, 13 Drawing Sheets

DURING LEARNING

START FRAME

NEXT OR LATER FRAME

DURING INFERENCE

START FRAME

NEXT OR LATER FRAME

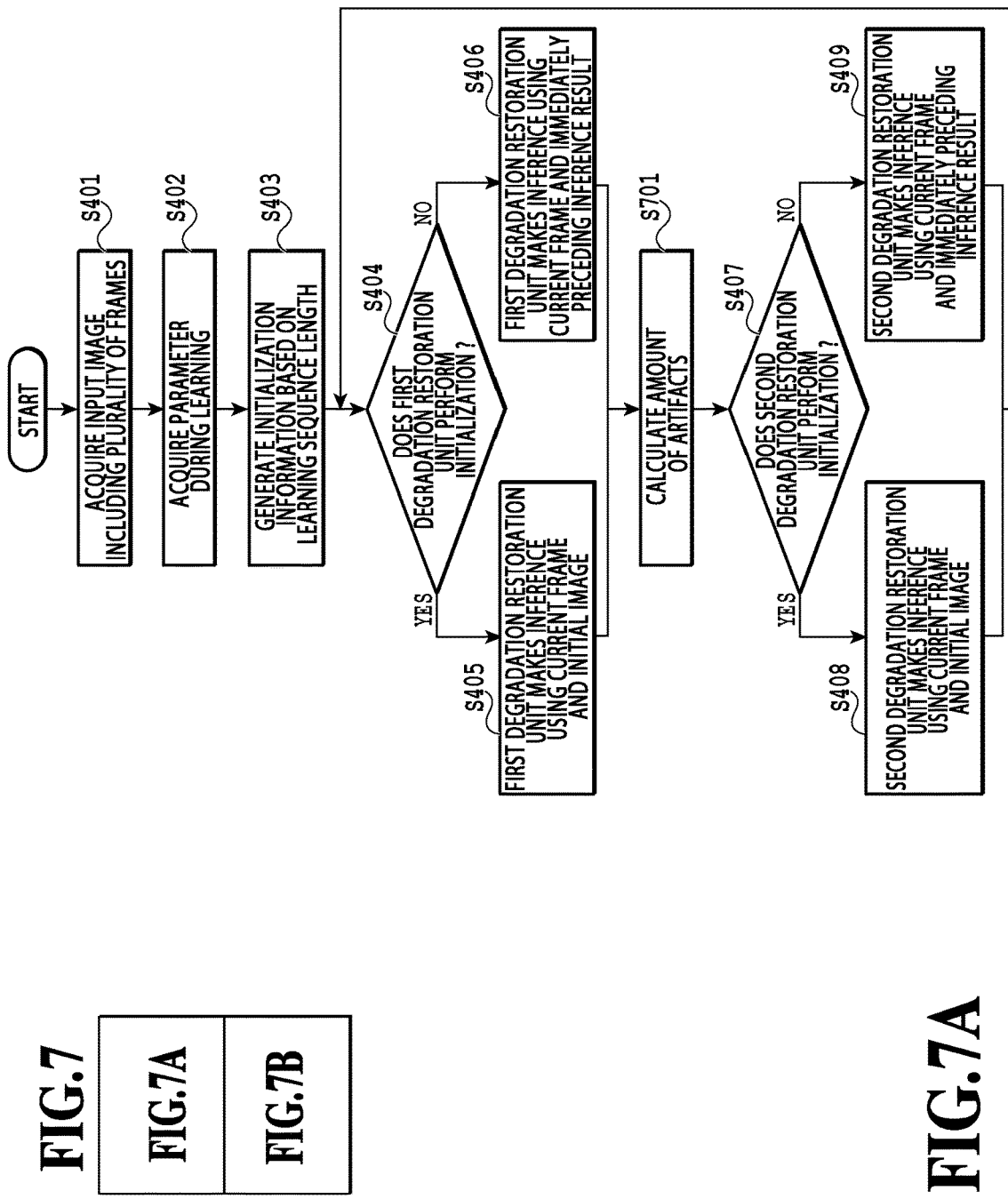

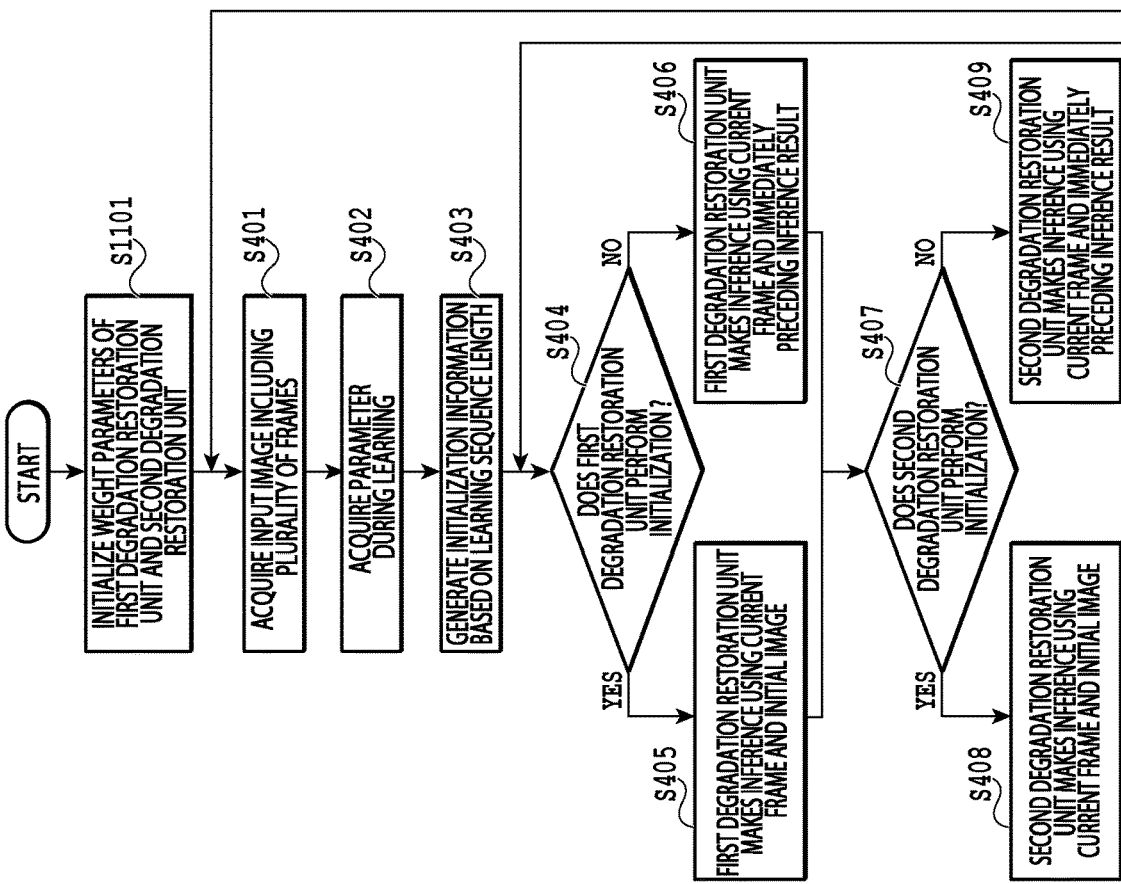

IMAGE PROCESSING APPARATUS, IMAGE PROCESSING METHOD, AND STORAGE MEDIUM, WITH SYNTHESIS OF TWO INFERENCE RESULTS ABOUT AN IDENTICAL FRAME AND WITH INITIALIZING OF RECURRENT INFORMATION

BACKGROUND

Field

The present disclosure relates to an image processing technique using a neural network.

Description of the Related Art

In recent years, a convolutional neural network (CNN) has been applied to many super-resolution processing applications for moving images. Super resolution specifically indicates a process of rolling back an original image from a degraded image, such as super resolution, noise removal, blur removal, and defect compensation, and a process of generating an image with a higher resolution than that of the original image.

Among CNNs, a convolutional recurrent neural network (CRNN) using inference results at times before the current time during processing as a portion of inputs at the current time is used to utilize time-series information on a moving image. In Japanese Patent No. 7007000, this CRNN is used to perform image restoration processing for each frame of a moving image. Specifically, a result of image restoration in the current frame is inferred based on an input image of the current frame being processed and results of inferences in frames preceding the current frame.

However, in the technique disclosed in Japanese Patent No. 7007000, in a moving image having more frames of a moving image to be input than frames of a moving image for learning, an artifact on image quality such as ringing and spurious resolution occurs in an output image. Further, since the inference result including the artifact on image quality is used as recurrent information in inferences in subsequent frames, artifacts on image quality sharply increase in a case where the number of frames to be processed exceeds a certain number. To suppress the artifacts on image quality, it is only required that the recurrent information be initialized. However, since the inference result obtained using the initialized recurrent information has lower restoration accuracy than that of an inference result immediately before the initialization, the restoration accuracy of the output image varies greatly before and after the initialization.

SUMMARY

The present disclosure is directed to an image processing apparatus comprising an image acquisition unit configured to acquire input image data including a plurality of frames, a first inference unit configured to output an inference result using a learned recurrent type neural network for a first frame group which is at least a portion of the plurality of frames, a second inference unit different from the first inference unit and configured to output an inference result using a learned recurrent type neural network for a second frame group which is a frame group of at least a portion of the plurality of frames and at least a portion of which overlaps the first frame group, a synthesizer configured to synthesize two inference results about an identical frame output from the first inference unit and the second inference unit, and an initialization unit configured to initialize recurrent information on the learned recurrent type neural networks of the first inference unit and the second inference unit, wherein frames in which an inference is made using the recurrent information initialized by the initialization unit are different between the first inference unit and the second inference unit.

Further features of the present disclosure will become apparent from the following description of exemplary embodiments with reference to the attached drawings.

BRIEF DESCRIPTION OF THE DRAWINGS

FIG. 7 is a diagram showing the relationship between FIGS. 7A and 7B;

FIG. 7A is a flowchart of processing in the edge device in the image processing system according to the second embodiment;

FIG. 11 is a diagram showing the relationship between FIGS. 11A and 11B;

FIG. 11A is a flowchart of processing in the edge device in the image processing system according to the third embodiment.

DESCRIPTION OF THE EMBODIMENTS

Figure 1:
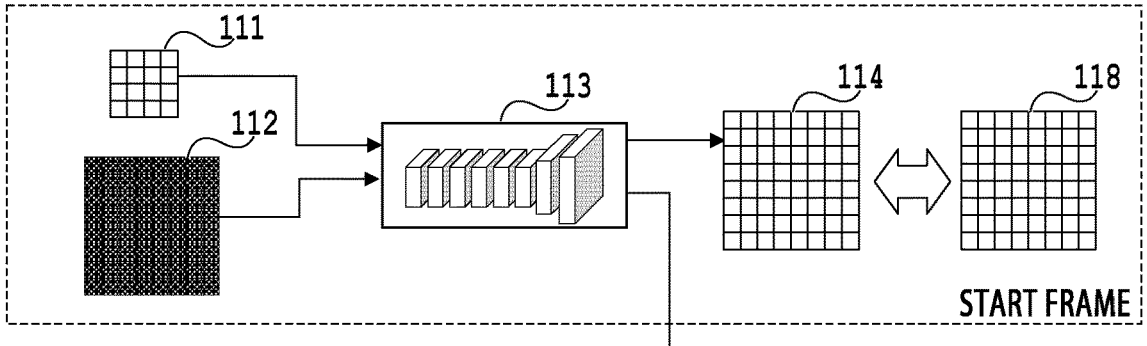
FIG. 1 is a diagram showing an example of a configuration of an image processing system.
Figure 1:
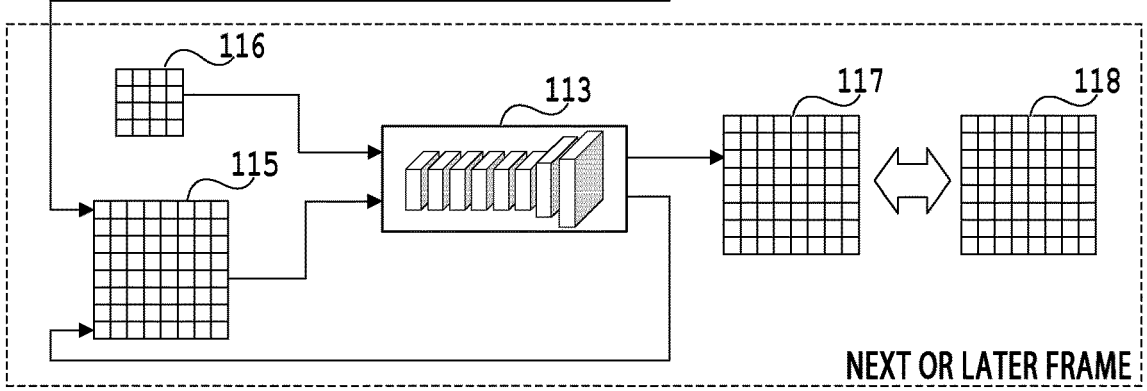
Figure 1:
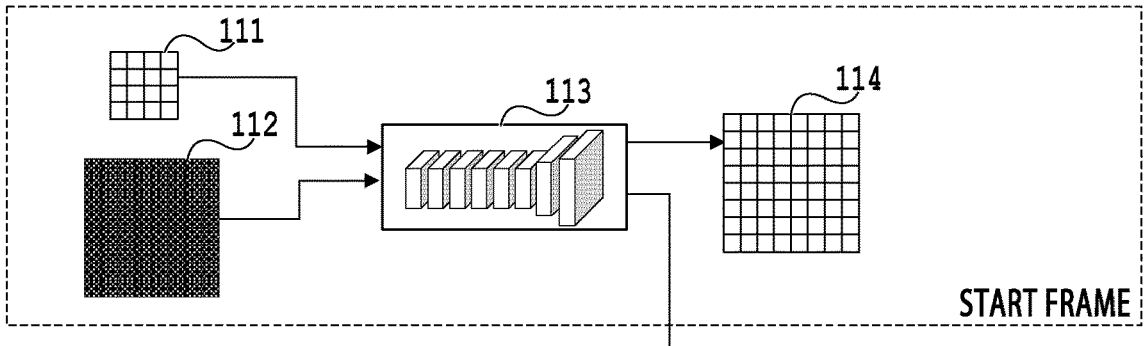
Figure 1:
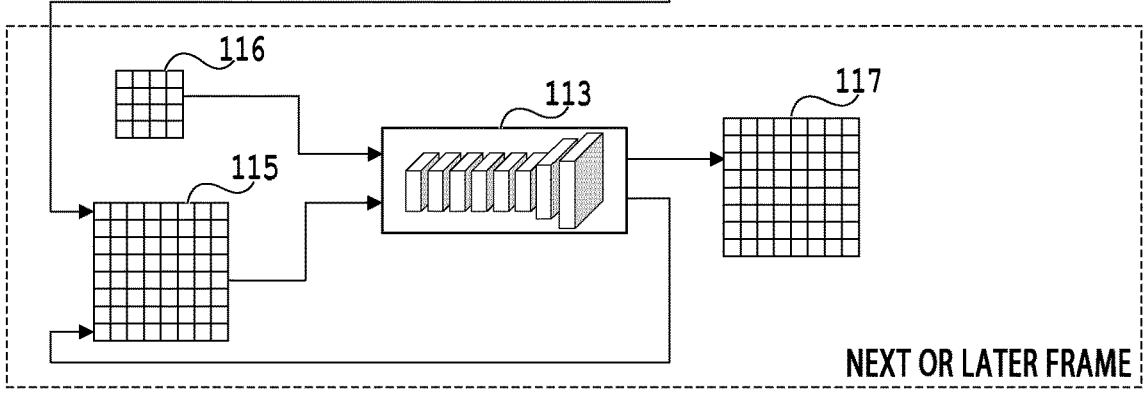

Hereinafter, modes for carrying out the present disclosure will be described with reference to the accompanying drawings. It should be noted that configurations shown in the following embodiments and examples are merely examples, and the present disclosure is not limited to the illustrated configurations.

Regarding a CNN

First, a description will be given of a Convolutional Neural Network (CNN) which will appear in the following embodiments and is used in general image processing techniques applying deep learning. The CNN is a technique in which a non-linear operation is repeated after a filter generated by training or learning is convoluted with image data. The filter is also referred to as local receptive field. The image data obtained by performing the non-linear operation after convoluting the filter with the image data is referred to as feature map. Further, learning is performed using learning data (training images or data sets) including a pair of input image data and output image data. In brief, the learning is to generate, from the learning data, a filter value with which the input image data can be converted to corresponding output image data with high accuracy. This will be described later in detail. In a case where the image data has an RGB color channel or where the feature map includes a plurality of pieces of image data, the filter to be used for convolution also has a plurality of channels accordingly. That is, a convolution filter is expressed by a four-dimensional array that includes the number of channels in addition to a length-to-width size and the number of sheets.

A process of performing a non-linear operation after convolving the filter with the image data (or the feature map) is expressed in units of layers, such as an n-th layer feature map or an n-th layer filter. For example, a CNN in which filter convolution and a non-linear operation are repeated three times has a three-layer network structure. Such non-linear operation processing can be formulated as shown in Formula (1) below.

$$X_n^{(l)} = f\left(\sum_{n=1}^{N} W_n^{(l)} * X_{n-1}^{(l)} + b_n^{(l)}\right) \quad (1)$$

In Formula (1) above, $W_n$ is an n-th layer filter, $b_n$ is an n-th layer bias, f is a non-linear operator, $X_n$ is an n-th layer feature map, and * is a convolution operator. It should be noted that (1) on a right shoulder denotes being an lth filter or feature map. A filter and bias are generated by learning which will be described later and are also collectively referred to as "network parameter." For example, a sigmoid function or a Rectified Linear Unit (ReLU) is used as the non-linear operation. In the case of the ReLU, Formula (2) below is given.

$$f(X) = \begin{cases} X & \text{if } 0 \le X \\ 0 & \text{otherwise} \end{cases} \quad (2)$$

As shown in Formula (2) above, among input vectors X, a negative one is set to zero, and a positive one is left as it is.

As a network using a CNN, a ResNet in the image recognition field and its application RED-Net in the super-resolution field are famous. In both cases, an increase in the accuracy of processing is intended by multi-layering the CNN and performing filter convolution many times. For example, the ResNet is characterized by a network structure provided with a path to shortcut a convolutional layer, thereby implementing a multi-layer network of 152 layers and implementing highly accurate recognition approaching the rate of recognition by humans. It should be noted that the reason why the accuracy of processing is increased by the multi-layer CNN is simply that a more complex non-linear relationship between input and output can be expressed by repeating a non-linear operation many times.

Learning of a CNN

Next, the learning of a CNN will be described. The learning of a CNN is performed by minimizing an objective function generally expressed by Formula (3) below for learning data including a set of input learning image (student image) data and corresponding output learning image (teacher image) data.

$$L(\theta) = \frac{1}{n}\sum_{i=1}^{n} \|F(X_i; \theta) - Y_i\|_2^2 \quad (3)$$

In Formula (3) above, L is a loss function for measuring an error between a correct answer and an estimate thereof. $Y_i$ is i-th output learning image data, and $X_i$ is i-th input learning image data. Further, F is a function collectively representing operations (Formula 1) performed in respective layers of the CNN. θ is a network parameter (filter and bias). $\|Z\|_2$ is an L2 norm, and is simply a square root of the sum of squares of an element of a vector Z. Further, n is the total number of sheets of learning data to be used for learning. Since the total number of sheets of learning data is generally large, a portion of the learning image data is randomly selected and used for learning in the Stochastic Gradient Descent method (SGD). This can reduce a computational load in learning using a lot of learning data. As a method of minimizing (=optimizing) an objective function, various methods such as the momentum method, the AdaGrad method, the AdaDelta method, and the Adam method are known. The Adam method is given by Formula (4) below.

$$g = \frac{\partial L}{\partial \theta_i^t}$$
$$m^t = \beta_1 m^{t-1} + (1 - \beta_1)g$$
$$v^t = \beta_2 v^{t-1} + (1 - \beta_2)g^2$$
$$\theta_i^{t+1} = \theta_i^t - \alpha \frac{\sqrt{1-\beta_2}}{(1-\beta_1)} \frac{m^t}{(\sqrt{v^t} + \varepsilon)} \quad (4)$$

In Formula (4) above, $\theta_i^t$ is an i-th network parameter in a t-th iteration, and g is a gradient of a loss function L with respect to $\theta_i^t$. Further, $m^t$ and $v^t$ are moment vectors in the t-th iteration, α is a base learning rate, β1 and β2 are hyperparameters, and ε is a small constant. Incidentally, since there is no selection guideline for optimization methods in learning, basically any method can be used. However, it is known that a difference in learning time arises due to a convergence property depending on each method.

Regarding a CRNN

A description will be given of a Convolutional Recurrent Neural Network (CRNN) often used to process time-series data using a CNN.

FIG. 1 shows the flow of learning and inference for image degradation restoration processing for a moving image using a CRNN. First, during learning, a degraded image 111 including image degradation and initial image data 112 indicating that the current frame is a start frame are input into an image restoration network 113 in the start frame. As a result, a rolled-back image 114 in the start frame and recurrent information 115 to be carried over to a subsequent frame are obtained as network calculation results. In the case of the subsequent or later frame, a degraded image 116 in this frame and the recurrent information 115 in the preceding frame are input into the image restoration network to obtain a rolled-back image 117. Each of the obtained rolled-back images is compared with corresponding correct image data 118, and the weight parameters of the image restoration network 113 are updated so as to reduce an error.

During the inference, the degraded image 111 and the initial image data 112 are input into the image restoration network 113 obtained by learning to obtain the rolled-back image 114 in the start frame. In the subsequent frame, the degraded image 116 in the start frame and the recurrent information 115 in the start frame are input into the image restoration network 113 to obtain the rolled-back image 117.

The number of frames of a moving image used during learning is referred to as learning sequence length. In a case where the number of frames input during an inference exceeds the learning sequence length, the image quality of a rolled-back image generally deteriorates.

First Embodiment

In the present embodiment, in image restoration processing, an inference is made by using a recurrent type neural network to suppress artifacts on image quality and changes in restoration accuracy. Then, in the present embodiment, a description will be given of a method of obtaining a degradation restoration result in which artifacts on image quality are suppressed by synthesizing and outputting inference results of a plurality of series different in the number of accumulated frames. In the present embodiment, low resolution will be described as an example of a degradation factor.

Example of a Configuration of an Image Processing System

Figure 2:
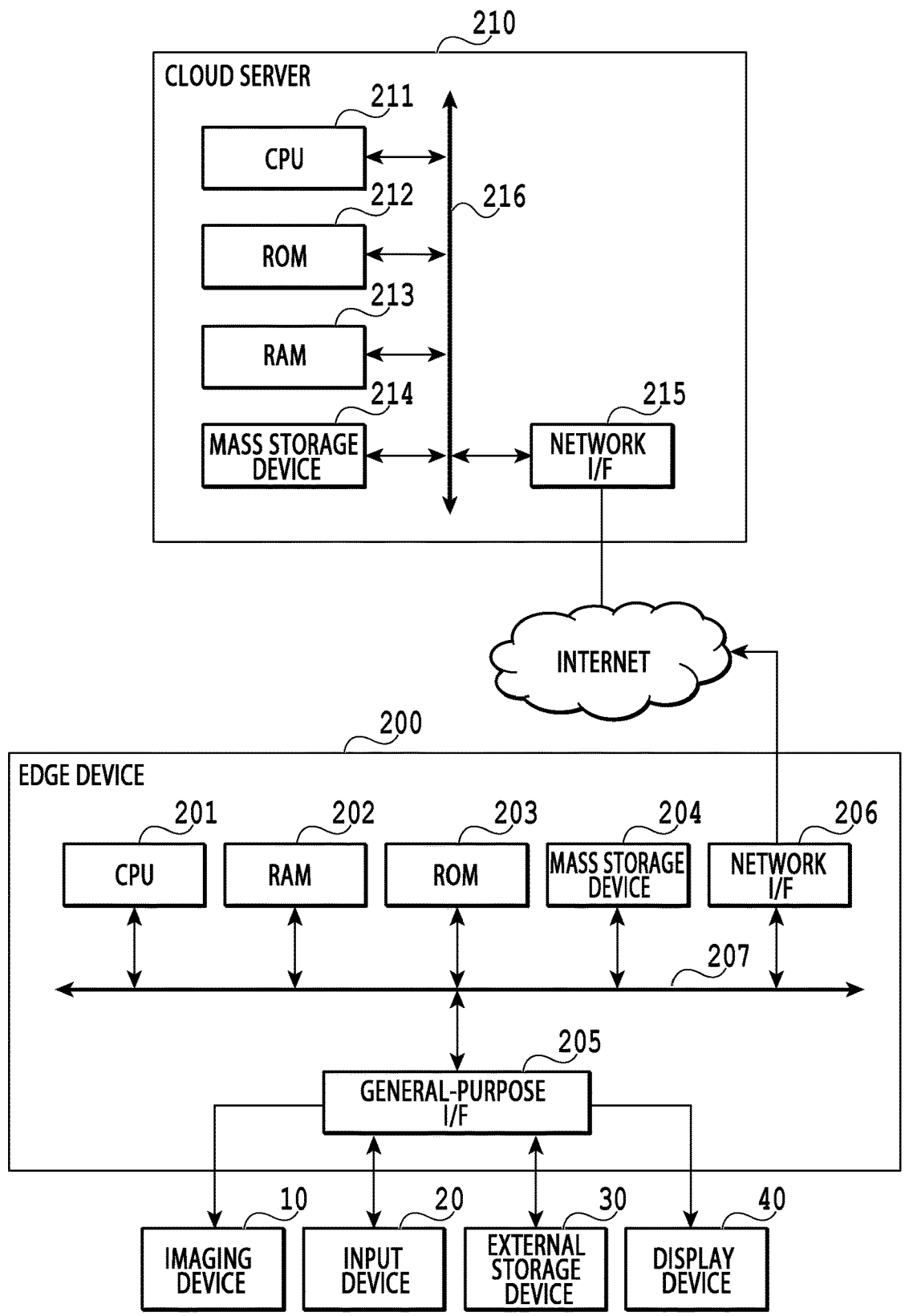
FIG. 2 is a diagram for explaining the structure of a CRNN and the flow of learning.

FIG. 2 is a diagram showing an example of a configuration of an image processing system according to the present embodiment. A cloud server 210 responsible for generating learning data and learning estimation and restoration of image quality degradation (hereinafter referred to as degradation restoration learning) and an edge device 200 responsible for rolling back an original image from a degraded image (hereinafter referred to as degradation restoration inference) are connected to each other via the Internet. As in a configuration according to the third embodiment, the degradation restoration learning may also be performed in the edge device 200.

Hardware Configuration of the Edge Device

The edge device 200 according to the present embodiment is an image processing apparatus that performs the degradation restoration inference by applying learned network parameters provided from the cloud server 210 to image data input from an imaging device 10. A user uses an image processing application installed in the edge device 200 to apply super-resolution processing to the image data.

The edge device 200 includes a CPU 201, a RAM 202, a ROM 203, a mass storage device 204, a general-purpose interface (I/F) 205, and a network I/F 206, each constituent being interconnected via a system bus 207. The edge device 200 is also connected to the imaging device 10, an input device 20, an external storage device 30, and a display device 40 via the general-purpose I/F 205.

The CPU 201 executes a program stored in the ROM 203 using the RAM 202 as a work memory and integrally controls each constituent of the edge device 200 via the system bus 207. The mass storage device 204 is, for example, an HDD or SSD and stores various kinds of data to be handled by the edge device 200. The CPU 201 writes data to the mass storage device 204 and reads the data stored in the mass storage device 204 via the system bus 207.

The general-purpose I/F 205 is a serial bus interface such as USB, IEEE 1394, and HDMI (registered trademark). The edge device 200 acquires data from the external storage device 30 (for example, various storage media such as a memory card, CF card, SD card, and USB memory) via the general-purpose I/F 205. The edge device 200 also receives user instructions from the input device 20 such as a mouse and keyboard via the general-purpose I/F 105. The edge device 200 also outputs image data and the like processed by the CPU 201 to the display device 40 (for example, various image display devices such as a liquid crystal display) via the general-purpose I/F 205. The edge device 200 also acquires data on a captured image (RAW image) to be subjected to super-resolution processing from the imaging device 10, which is an imaging device, via the general-purpose I/F 205.

The network I/F 206 is an interface for make connections to the Internet. The edge device 200 accesses the cloud server 210 through an installed web browser to acquire network parameters for the degradation restoration inference.

Hardware Configuration of a Cloud Server

The cloud server 210 according to the present embodiment is a server device that provides cloud services on the Internet. More specifically, generation of learning data and degradation restoration learning are performed to provide a learned model storing the network parameters and network structure, which are learning results, in response to a request from the edge device 200.

The cloud server 210 includes a CPU 211, a ROM 212, a RAM 213, a mass storage device 214, and a network I/F 215, each constituent being interconnected via a system bus 216. The CPU 211 reads a control program stored in the ROM 212 and executes various processes to control the overall operation. The RAM 213 is used as a main memory of the CPU 211 or a temporary storage area such as a work area. The mass storage device 214 is a secondary mass storage device such as an HDD or SSD for storing image data and various kinds of programs. The network I/F 215 is an interface for making connections to the Internet and provides the network parameters described above in response to a request from the web browser of the edge device 200.

The edge device 200 and the cloud server 210 also have constituents other than those described above, but they are not the focus of the present disclosure. Thus, descriptions thereof will be omitted. The present embodiment is on the assumption that the cloud server 210 performs learning data generation and degradation restoration learning, downloads a learned model, which is a learning result, to the edge device 200, and performs a degradation restoration inference on the RAW image data. However, the above system configuration is an example, and the present disclosure is not limited to this. For example, the functions of the cloud server 210 may be subdivided, and the learning data generation and the degradation restoration learning may be performed by separate devices. Further, the imaging apparatus 10 having both the function of the edge device 200 and the function of the cloud server 210 may be configured to perform all of the learning data generation, degradation restoration learning, and degradation restoration inference.

Process Flow of the Entire System

Figure 3A:
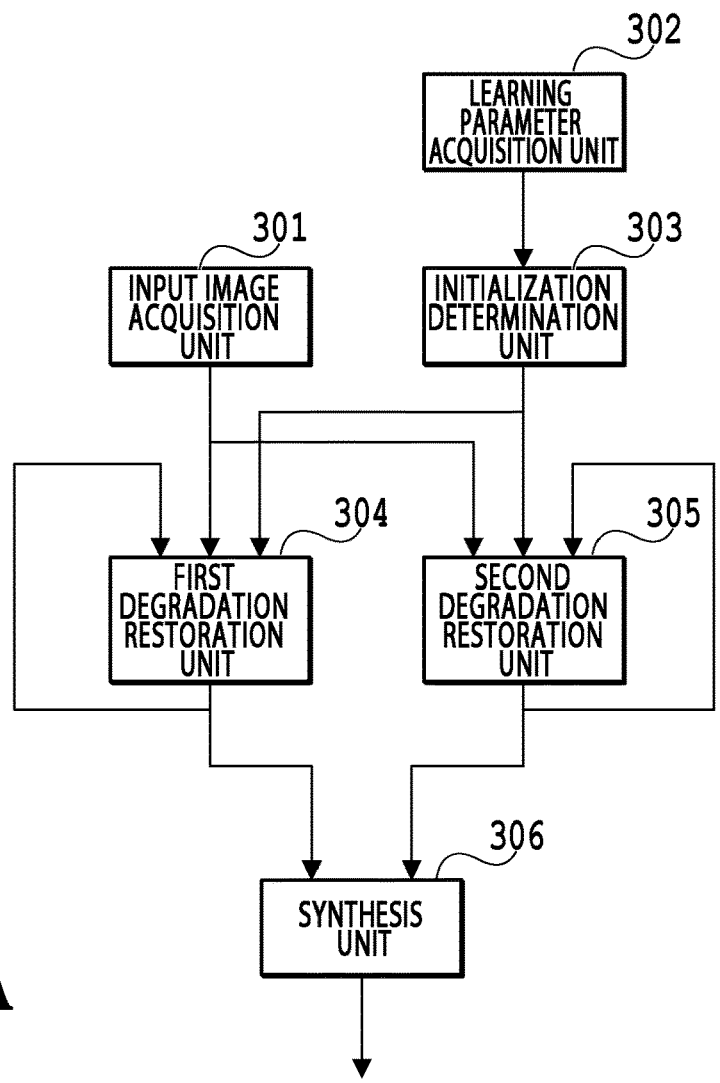
FIG. 3A is a functional block diagram of an edge device in the image processing system according to a first embodiment.
Figure 3B:
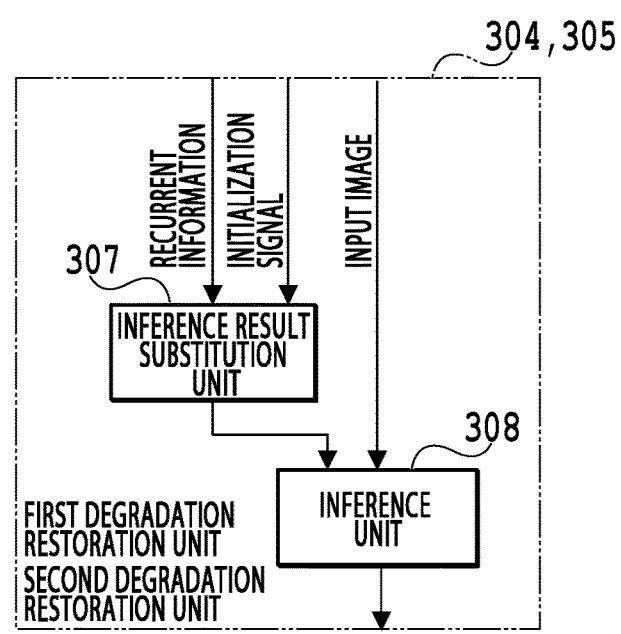
FIG. 3B is a functional block diagram of the edge device in the image processing system according to the first embodiment.
Figure 4:
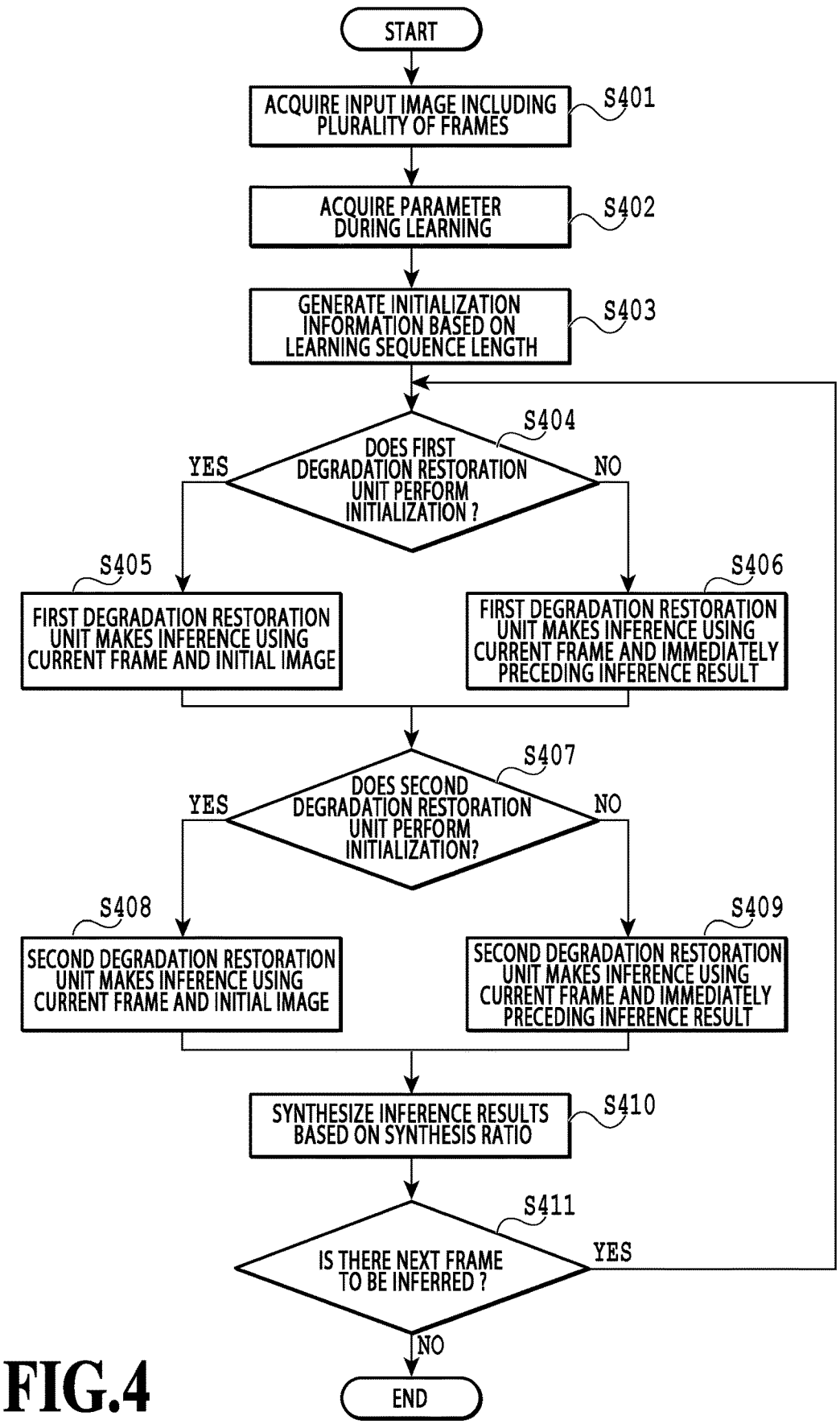
FIG. 4 is a flowchart of processing in the edge device in the image processing system according to the first embodiment.

FIGS. 3A and 3B show functional blocks of the edge device 200 according to the present embodiment. Further, FIG. 4 shows a flowchart of processing performed by the edge device 200 according to the present embodiment. As shown in FIG. 3A, the edge device 200 includes an input image acquisition unit 301, a learning parameter acquisition unit 302, an initialization determination unit 303, a first degradation restoration unit 304, a second degradation restoration unit 305, and a synthesis unit 306. In addition, as shown in FIG. 3B, the first degradation restoration unit 304 and the second degradation restoration unit 305 each include an inference result substitution unit 307 and an inference unit 308.

It should be noted that the configurations shown in FIGS. 3A and 3B can be deformed or modified as appropriate. For example, one functional unit may be divided into a plurality of functional units, or two or more functional units may be integrated into one functional unit. The configurations shown in FIGS. 3A and 3B may also be implemented by two or more devices. In this case, the devices are connected via a circuit or a wired or wireless network, perform data communication with each other, and perform cooperative operations, so that each process to be described later can be implemented.

Hereinafter, in the present embodiment, low resolution is covered as an example of image degradation, and an example of making an inference about super-resolution processing for rolling it back will be described. It should be noted that the present disclosure is capable of reducing image degradation not only due to low resolution, but also due to other common factors such as blur, noise, compression, color decimation, fog/haze/rain/snow, aberrations, and defects.

In S401, the input image acquisition unit 301 acquires input image data including a plurality of frames including image degradation from the imaging device 10. It should be noted that a stored image may be acquired from the RAM 102 or the external storage device 30 instead of capturing the input image data. The acquired input image data is output to the first degradation restoration unit 304 and the second degradation restoration unit 305.

In S402, the learning parameter acquisition unit 302 acquires, from the cloud server 210, learning parameters at the time of learning the image restoration network 113 and extracts, from among the learning parameters, information on the number of frames of a moving image during learning (learning sequence length). The acquired information on the learning sequence length is output to the initialization determination unit 303.

In S403, the initialization determination unit 303 acquires information on the learning sequence length from the learning parameter acquisition unit 302 and generates initialization information specifying frames in which initialization is performed in the first degradation restoration unit 304 and the second degradation restoration unit 305. The initialization determination unit 303 outputs the generated initialization information to the first degradation restoration unit 304 and the second degradation restoration unit 305. It should be noted that initialization is an operation in which in the image restoration network 113, initial image data is used as recurrent information instead of using a result of an inference in a preceding frame as recurrent information. This makes it possible to reset an artifact caused by an inference included in the recurrent information.

Figure 5:
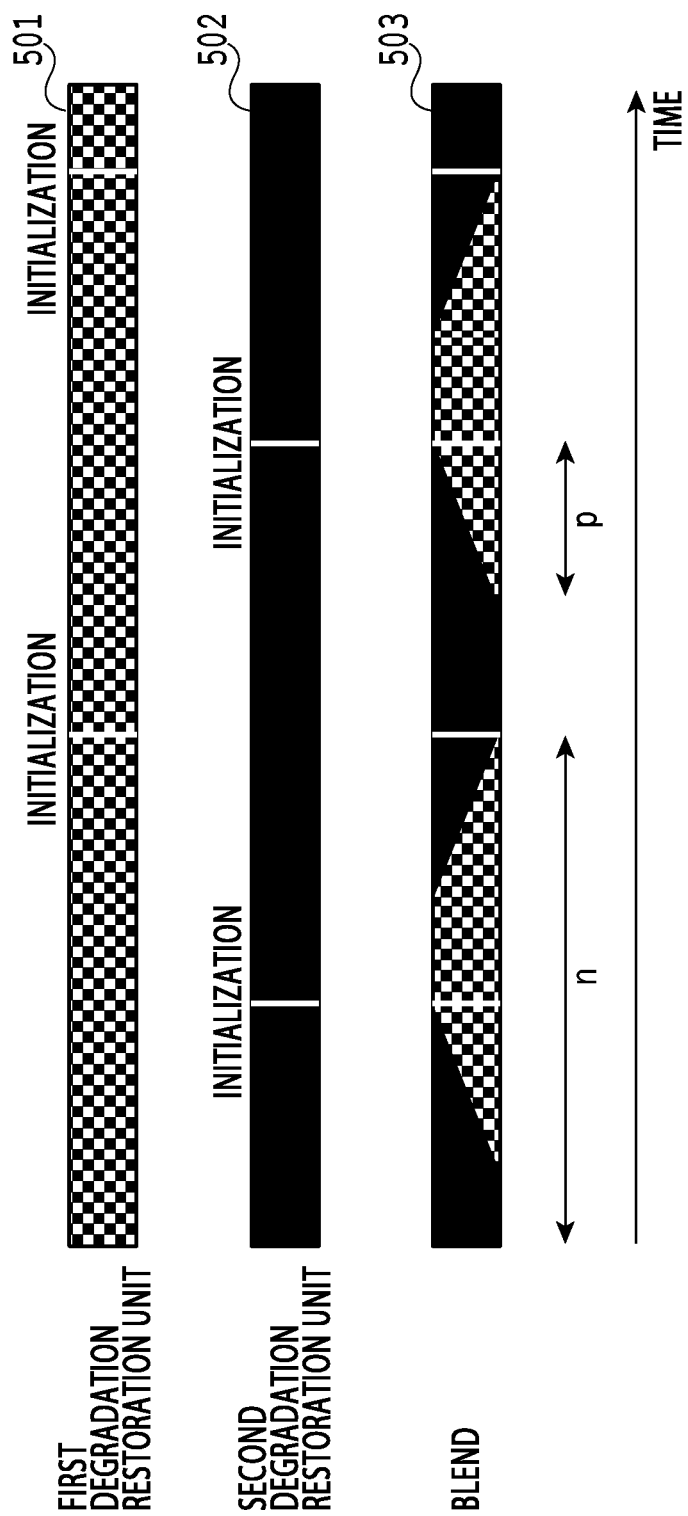
FIG. 5 is a diagram for explaining processes of initializing recurrent information and synthesizing inference results.

In a case where the learning sequence length is $f_k$, the initialization determination unit 303 determines that the first degradation restoration unit 304 performs initialization in an $f_k \times n$-th frame from the start of an inference and does not perform initialization in the other frames (n is a natural number). That is, the first degradation restoration unit 304 performs initialization in $f_k$th, $2f_k$th ... $f_k \times n$-th frames. The initialization determination unit 303 also determines that the second degradation restoration unit 305 performs initialization in an $[f_k \times (n-0.5)]$th frame from the start of an inference and does not perform initialization in the other frames ([ ] is a Gaussian symbol denoting that digits to the right of a decimal point are discarded). That is, the second degradation restoration unit 305 performs initialization in $[f_k \times 0.5]$th, $[n \times 1.5]$th ... $[f_k \times (n-0.5)]$th frames. Through such determination processing, as shown in graphs 501 and 502 shown in FIG. 5, the first degradation restoration unit 304 and the second degradation restoration unit 305 initialize recurrent information in different frames. Information designating a frame in which the recurrent information is initialized is referred to as initialization information, and the initialization determination unit 303 outputs the initialization information to the first degradation restoration unit 304 and the second degradation restoration unit 305.

The initialization determination may be made based on learning parameters other than the learning sequence length. For example, an artifact may be avoided by predicting the performance of the CRNN from learning parameters such as a learning rate, and the number of pieces of learning data so that the lower the performance is, the more the number of frames between frames in which initialization is performed is reduced.

In S404, the first degradation restoration unit 304 receives one frame (current frame) of the input image data from the input image acquisition unit 301, refers to the initialization information received from the initialization determination unit 303, and determines whether to initialize the recurrent information in the inference in the current frame. In a case where the current frame is a frame in which the initialized recurrent information is to be used to make an inference, the process proceeds to S405, and in a case where the current frame is not the frame in which the initialized recurrent information is to be used to make an inference, the process proceeds to S406. It should be noted that one frame of the input image data to be received from the input image acquisition unit 301 is a frame selected in order from among unprocessed frames included in the input image data.

In S405, the first degradation restoration unit 304 makes an inference about the current frame using the initial image data 112 as recurrent information and outputs an inference result to the synthesis unit 306 and the first degradation restoration unit 304 itself. The inference result output to the first degradation restoration unit 304 is used as recurrent information in the processing of a subsequent frame immediately after the current frame.

Here, the inference result substitution unit 307 of the first degradation restoration unit 304 first substitutes the predetermined initial image data 112 for the recurrent information in accordance with the initialization information. The initial image data 112 includes image data in which the number of pixels is the same as that of each frame of the input image data and all pixel values are 0 for each channel. This corresponds to treating the current frame as a start frame to make an inference. It should be noted that what is substituted for the recurrent information is not limited to the initial image data 112. For example, it is possible to use a result of an inference iterated t' (t'<t) times less than the number of inferences iterated t in the current frame. In a case where the number of iterations t'=0, an inference result corresponds to the initial image data 112. As described above, initializing recurrent information according to initialization information limits the number of iterated inferences t. Thus, it is possible to suppress the amount of artifacts included in the inference result.

Next, the inference unit 308 in the first degradation restoration unit 304 inputs the current frame and the recurrent information to the image restoration network 113 to generate an inference result.

In S406, the first degradation restoration unit 304 makes an inference about the current frame using, as recurrent information, a result of an inference about the subsequent frame immediately before the current frame from the first degradation restoration unit 304 itself and outputs an inference result to the synthesis unit 306 and the first degradation restoration unit 304 itself.

In S407, the second degradation restoration unit 305 receives one frame (current frame) of the input image data from the input image acquisition unit 301, refers to the initialization information received from the initialization determination unit 303, and determines whether to initialize the recurrent information in the inference in the current frame. In a case where the current frame is a frame in which initialization is to be performed, the process proceeds to S408, and in a case where the current frame is not the frame in which initialization is to be performed, the process proceeds to S409. It should be noted that one frame of the input image data received from the input image acquisition unit 301 is a frame selected in order from among unprocessed frames included in the input image data.

In S408, like the first degradation restoration unit 304 in S405, the second degradation restoration unit 305 makes an inference about the current frame using the initial image data 112 as recurrent information and then outputs an inference result to the synthesis unit 306 and the second degradation restoration unit 305 itself. The inference result output to the second degradation restoration unit 305 is used as recurrent information in processing of the subsequent frame immediately after the current frame.

In S409, like the first degradation restoration unit 304 in S406, the second degradation restoration unit 305 makes an inference about the current frame using, as recurrent information, a result of an inference about the preceding frame immediately before the current frame from the second degradation restoration unit 305 itself and then outputs an inference result to the synthesis unit 306 and the second degradation restoration unit 305 itself.

It should be noted that the first degradation restoration unit 304 and the second degradation restoration unit 305 make similar inferences using RCNNs having the same architecture and weight parameter. The processes by the first degradation restoration unit 304 and the second degradation restoration unit 305 are performed in the same hardware.

Specifically, an inference is made with a batch size of 2 on a GPU, a first batch being an inference sequence for the first degradation restoration unit 304, a second batch being an inference sequence for the second degradation restoration unit 305. It should be noted that another piece of hardware such as a CPU or FPGA may be used to make an inference, and the processes by the first degradation restoration unit 304 and the second degradation restoration unit 305 may be performed in separate pieces of hardware.

In S410, the synthesis unit 306 receives a first inference result of super-resolution processing from the first degradation restoration unit 304, receives a second inference result of super-resolution processing from the second degradation restoration unit 305, and associates these inference results about the same frame to form an image pair. A result I obtained by synthesizing the image pair by alpha blending is then output. A synthesis ratio is determined based on the frame number of the current frame. Specifically, a formula for calculating the output result I is as follows.

$$I = \begin{cases} I_0 & (t \geq p) \\ \frac{t}{p}I_0 + \left(1 - \frac{t}{p}\right)I_1 & (0 < t < p) \end{cases} \quad (5)$$

Here, t is the number of frames until next initialization, $I_0$ is an image of an inference result output by a degradation restoration unit in which next initialization is to be performed out of the image pair, and $I_1$ is an image of an inference result output by the other degradation restoration unit out of the image pair. Further, p is the predetermined number of initialization preparation frames and represents the gradualness of image switching. In this process, as shown in a graph 503 shown in FIG. 5, immediately after initialization, the ratio of the image $I_0$ to be output by a degradation restoration unit in which next initialization is to be performed is high, the ratio of the image $I_0$ is gradually decreased, and the ratio of the image $I_1$ to be output by the degradation restoration unit in which next initialization is not performed increases. In a frame immediately before the initialization, the ratio of the image $I_1$ becomes the highest, and in a frame in which initialization is performed, the image $I_1$ becomes the image $I_0$, and the image $I_0$ becomes the image $I_1$. Accordingly, in a synthesized image output from the synthesis unit 306, results of the processes by the first degradation restoration unit 304 and the second degradation restoration unit 305 are smoothly switched without a sudden change in the degree of image restoration due to the initialization. The synthesized image obtained from the synthesis unit 306 is a final output of the super-resolution processing.

In S411, the first degradation restoration unit 304 determines whether there is a next inference target frame. In a case where the next inference target frame exists, the process proceeds to S404, and in a case where there is no next inference target frame, a series of processes ends.

Incidentally, the image restoration network 113 is not limited to the configuration described in the present embodiment.

In the present embodiment, the recurrent information output from the image restoration network 113 is an image having the same number of pixels as that of each frame of the input image data. However, the recurrent information may be a feature map, and the number of pixels may be the same as that of a super-resolution result and different from that of each frame of the input image data.

Moreover, in input into the image restoration network 113, the degraded images 111 and 116 are not limited to an inference result in the current frame, and the recurrent information 115 is not limited to an inference result in a preceding frame. As the degraded images 111 and 116 to be input, instead of the current frame, a frame preceding by one frame or more or a frame subsequent to the subsequent frame may be used. As the recurrent information 115, a result of an inference about a frame preceding by two or more frames or a frame subsequent to the subsequent frame may be used. The degraded images 111 and 116 and the recurrent information 115 may be a combination of the above usable ones.

The initial image data 112 is not limited to image data in which all pixel values are zero. The initial image data 112 may have another predetermined pixel value or may be image data in a specific pattern. Further, a plurality of kinds of initial image data 112 may be used during learning, and one of them may be used as the initial image data 112 during an inference.

Layers constituting the image restoration network 113 may include a layer other than a convolution layer. For example, a three-dimensional convolution layer, a deformable convolution layer, an optical flow calculation block, an alignment block, and the like used for analyzing time-series information may be included.

The image restoration network 113 is not limited to a CRNN and may be a recurrent type neural network in which a degradation restoration result is determined depending on a plurality of past frames. For example, the image restoration network 113 may be a recurrent type neural network in which the input of tensor data obtained by connecting the plurality of past frames in a channel direction is received.

In the present embodiment, a plurality of frames are acquired as input image data at a time in S401, but the frames may be acquired one by one. In this configuration, in a case where there is a next inference target frame in S411, the process returns to S401, and in a case where there is no change in the image restoration network 113, S402 and S403 can be omitted.

In the present embodiment, S404 to S406 and S407 to S409 are processed sequentially but may be processed in parallel.

In the present embodiment, the example in which two super-resolution results are inferred and synthesized has been described. The number of processing results to be synthesized may be three or more. In that case, the synthesis unit 306 should synthesize three or more processing results. In such a case, although processing time increases, a processing result more robust in time series can be obtained.

The above is the overall flow of processing performed in the image processing system according to the present embodiment. The first degradation restoration unit and the second degradation restoration unit infer an image to be a degradation restoration result depending on information on each frame received from the most recent initialization to the present. The number of depended frames will be referred to as the number of accumulated frames. In general, the greater the number of accumulated frames is, the more frame information can be integrated, so that sharpness increases. However, the amount of artifacts generated also increases. In the present embodiment, once the number of accumulated frames reaches a certain number or more, the number of accumulated frames is always equal to or more than the certain number afterwards, and inference results whose number of frames is less than the learning sequence length are synthesized at a high ratio, resulting in obtaining a highly sharp inference result in which artifacts on image quality are suppressed.

As shown in Formula (5), smoothly changing the image synthesis ratio in conjunction with a change in frames can obtain inference results having temporal continuity without a sudden change in the degree of image restoration due to the influence of initialization.

Second Embodiment

In the first embodiment, initialization is performed at a time at which the number of accumulated frames reaches the learning sequence length. This is because in a case where the number of accumulated frames is larger than the learning sequence length, the amount of artifacts generated often increases. However, depending on the image quality and contents of the input image data, even in a case where the number of accumulated frames is less than the learning sequence length, the amount of artifacts generated may increase. For example, an artifact is likely to be generated at an early stage on input image data corresponding to a subject or movement, the content of which is small in learning data.

Thus, in the present embodiment, evaluating the amount of artifacts generated from image data, which is an inference result, and determining the timing of synthesizing inference results and initializing recurrent information based on the amount of artifacts generated enable more stable reduction in artifacts on image quality.

Figure 6:
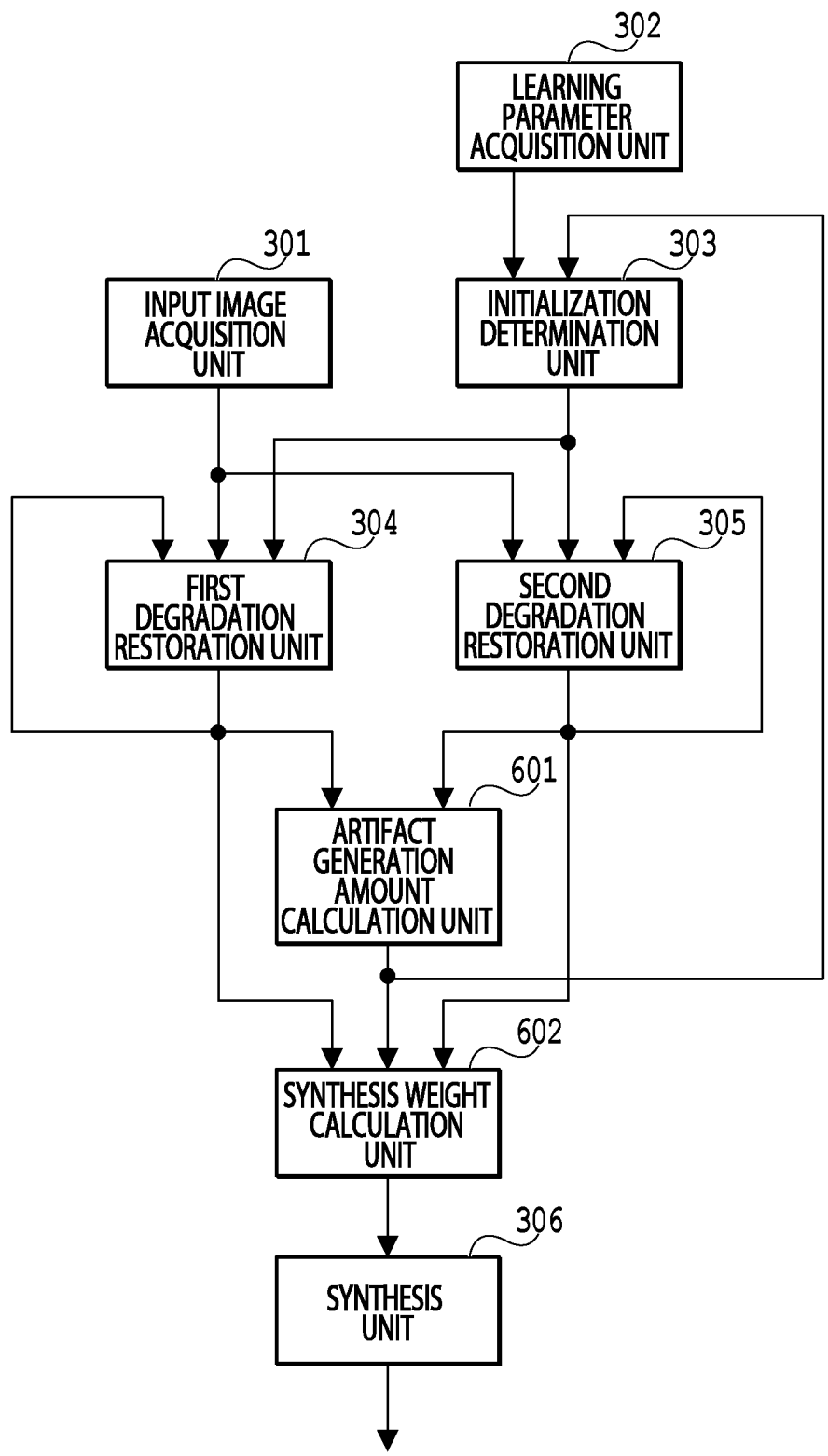
FIG. 6 is a functional block diagram of the edge device in the image processing system according to the second embodiment.
Figure 7B:
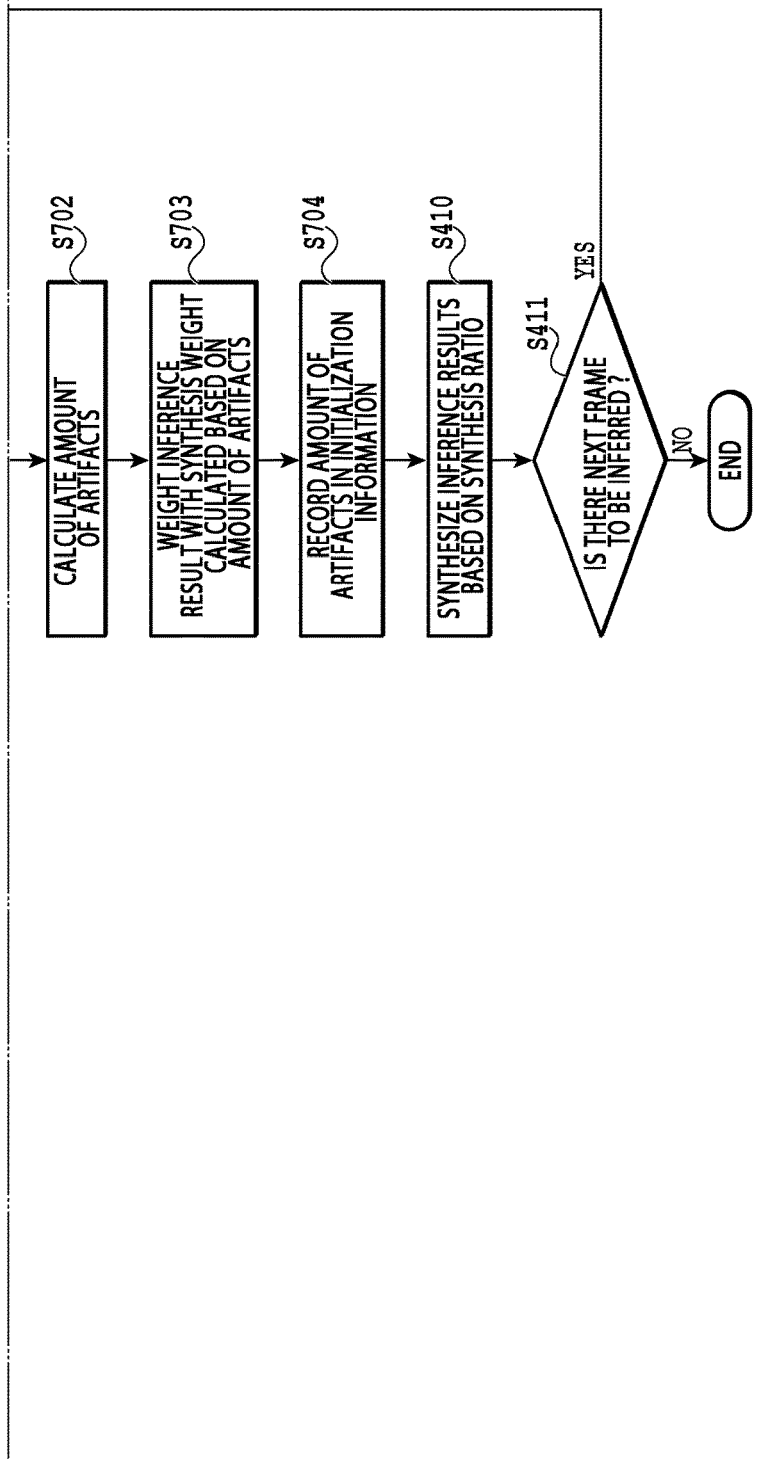
FIG. 7B is a flowchart of processing in the edge device in the image processing system according to the second embodiment.

FIG. 6 shows a functional block diagram of the image processing system according to the present embodiment. Additionally, FIG. 7 shows a flowchart of the processing of the image processing system according to the present embodiment. It should be noted that descriptions of the contents identical to those in the first embodiment, such as the basic configuration of the image processing system, will be omitted, and differences will be mainly described below.

In S701, an artifact generation amount calculation unit 601 receives a first inference result from the first degradation restoration unit and calculates the amount of artifacts generated.

In S702, as in S701, the artifact generation amount calculation unit 601 receives a second super-resolution result from the second degradation restoration unit and calculates the amount of artifacts generated. Main artifacts on image quality that occur in an RCNN in which super-resolution processing is performed are ringing and spurious resolution, both of which can be evaluated by detecting a sharp increase in high-frequency components contained in an inference result image. A high-frequency component amount s is then calculated based on Formula (6) below, and it is determined that the amount of artifacts on image quality becomes larger as the amount s increases over time.

$$s = \int_0^w \frac{1}{2\pi} \int_0^{2\pi} g(r\cos\theta, r\sin\theta) d\theta dr \qquad (6)$$

Figure 8A:
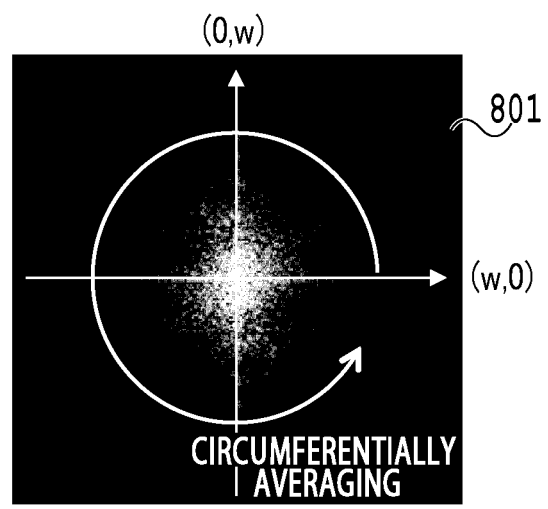
FIG. 8A is a diagram for explaining initialization determination based on an evaluation of the amount of artifacts.

Here, g(x, y) is an intensity at coordinates (x, y) on a power spectrum of a super-resolution result image, and w is a distance from the center to edge of the power spectrum. This formula represents the operation of integrating the power spectrum from the center to the edge after circumferentially averaging the power spectrum. FIG. 8A shows a power spectrum 801 having a high frequency component amounts s. The obtained high-frequency component amount s is output to the initialization determination unit 303 and a synthesis weight calculation unit 602.

In S703, the synthesis weight calculation unit 602 weights the first inference result and the second inference result with a synthesis weight calculated based on the high-frequency component amount s received from the artifact generation amount calculation unit 601. A synthesis weight $\alpha_0$ of an inference result image $I_0$ output by a degradation restoration unit in which next initialization is to be performed and a synthesis weight $\alpha_1$ of the inference result image $I_1$ output by the other degradation restoration unit are calculated so that the synthesis weight of an image with a large amount of artifacts generated is small. The calculation formula is as follows.

$$\alpha_0 = \frac{t}{p}\frac{s_1}{s_0} \quad (7)$$
$$\alpha_1 = 1 - \alpha_0$$

Here, $s_0$ is the high frequency component amount of $I_0$, and $s_1$ is the high frequency component amount of $I_1$. The synthesis weight calculation unit 602 outputs the result of weighting the images $I_0$ and $I_1$ with the obtained synthesis weights to the synthesis unit 306. The synthesis unit 306 synthesizes the images $I_0$ and $I_1$ with the weight. It should be noted that a weight calculation formula is not limited to the above, and another calculation method may be used as long as the weight is reduced as the amount of artifacts generated increases.

In S704, the initialization determination unit 303 receives the high frequency component amount s from the artifact generation amount calculation unit 601 as the amount of artifacts and records the high frequency component amount s in initialization information. In the present embodiment, in addition to the learning sequence length $f_k$, the high-frequency component amount s is used as initialization information, and initialization determination is performed in S404 and S407.

Figure 8B:
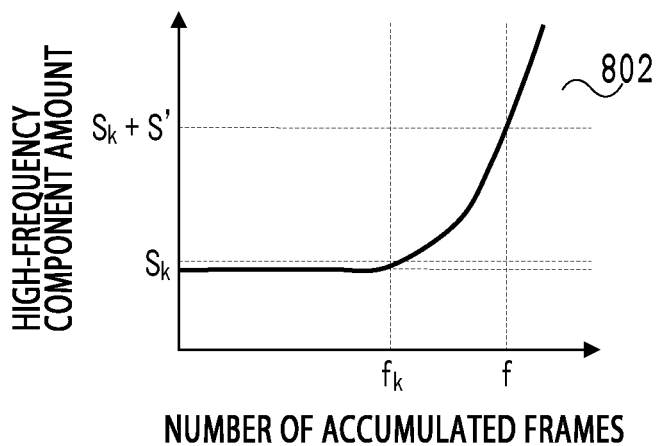
FIG. 8B is a diagram for explaining the initialization determination based on the evaluation of the amount of artifacts.

Here, a description will be given of an initialization determination method using the high-frequency component amount s. A graph 802 shown in FIG. 8B is a graph showing the high-frequency component amount s with respect to the number of accumulated frames f. Assuming that a high-frequency component amount is $s_k$ in a case where the number of accumulated frames f is a learning sequence length $f_k$, in the present embodiment, in a case where the high-frequency component amount of the number of current accumulated frames f exceeds $s_k$+s', it is determined that initialization is to be performed. Here, s' is a preset predetermined value. The above initialization determination is performed in the first degradation restoration unit 304 and the second degradation restoration unit 305. However, in a case where initialization is performed in one of the degradation restoration units in order to prevent the timings of initialization in the two degradation restoration units from being too close, initialization is not performed in the other degradation restoration unit from the frame following the frame in which the initialization is performed to the frame with the number of initialization preparation frames p.

In S410, the synthesis unit 306 receives the weighted images $\alpha_0 I_0$ and $\alpha_1 I_1$ from the synthesis weight calculation unit 602 and outputs a result I synthesized by alpha blending.

$$I = \begin{cases} \alpha_0 I_0 & (t \geq p) \\ \alpha_0 I_0 + \alpha_1 I_1 & (0 < t < p) \end{cases} \quad (8)$$

The above is the overall flow of processing performed in the image processing system according to the present embodiment. According to the present embodiment, calculating the amount of artifacts for evaluating an artifact on image quality for each frame and determining a frame in which initialization is performed according to the evaluation result make it possible not to include a predetermined amount or more of artifacts in an inference result. As a result, although a calculation amount increases, it is possible to obtain an inference result with less artifacts even in a case where the amount of artifacts increases faster than expected, such as a case where an image including an insufficiently learned subject or movement is input. That is, in the present embodiment, the high frequency component amount s according to Formula (6) is calculated for each frame, and the actual amount of artifacts in the inference result is used as a criterion for initialization, so that it is possible to suppress a delay in initialization that may occur due to fluctuations in the amount of artifacts with respect to the number of frames for each piece of input image data.

Incidentally, with reference to the high-frequency component amount $s_k$ where the number of accumulated frames is the learning sequence length $f_k$, the initialization determination unit 303 according to the present embodiment sets a threshold value for the amount of increase s' over the high-frequency component amount $s_k$, and makes an initialization determination depending on whether the threshold value is exceeded. However, an initialization determination method is not limited to this. For example, a reference frame may be a frame preceding the current frame by a certain number of frames or a frame in which initialization is performed most recently, other than the frame of the learning sequence length $f_k$. Further, a threshold may be set for another value related to the high-frequency component amount s, such as the absolute amount of high-frequency components or the temporal dispersion of the high-frequency components instead of the amount of increase over the reference value of the high-frequency components.

Further, in the present embodiment, the high-frequency component amount s is calculated according to Formula (6) and treated as an evaluation value for the amount of artifacts. However, the evaluation value for the amount of artifacts is not limited to this and may be another evaluation value as long as it has a correlation with the amount of artifacts generated. For example, as the number of accumulated frames f increases, the amount of artifacts also increases. Thus, the number of accumulated frames f may be the evaluation value for the amount of artifacts. The evaluation value for the amount of artifacts may also be a difference between the number of accumulated frames f and the learning sequence length $f_k$. This makes it possible to reduce the cost of calculation of an evaluation value for the amount of artifacts as compared to the calculation method of Formula (6) and carry out the present disclosure even in a device with a low throughput.

Third Embodiment

In the first and second embodiments, the description has been given of a mode in which the image restoration network 113 to which weight parameters are fixed is used to output a super-resolution-processed image. In the present embodiment, a description will be given of a method in which the amount of artifacts generated is evaluated from the super-resolution-processed image to update the weight parameters of the image restoration network 113 on the edge device 200 so that artifacts on image quality are reduced based on the amount of artifacts generated.

Figure 10:
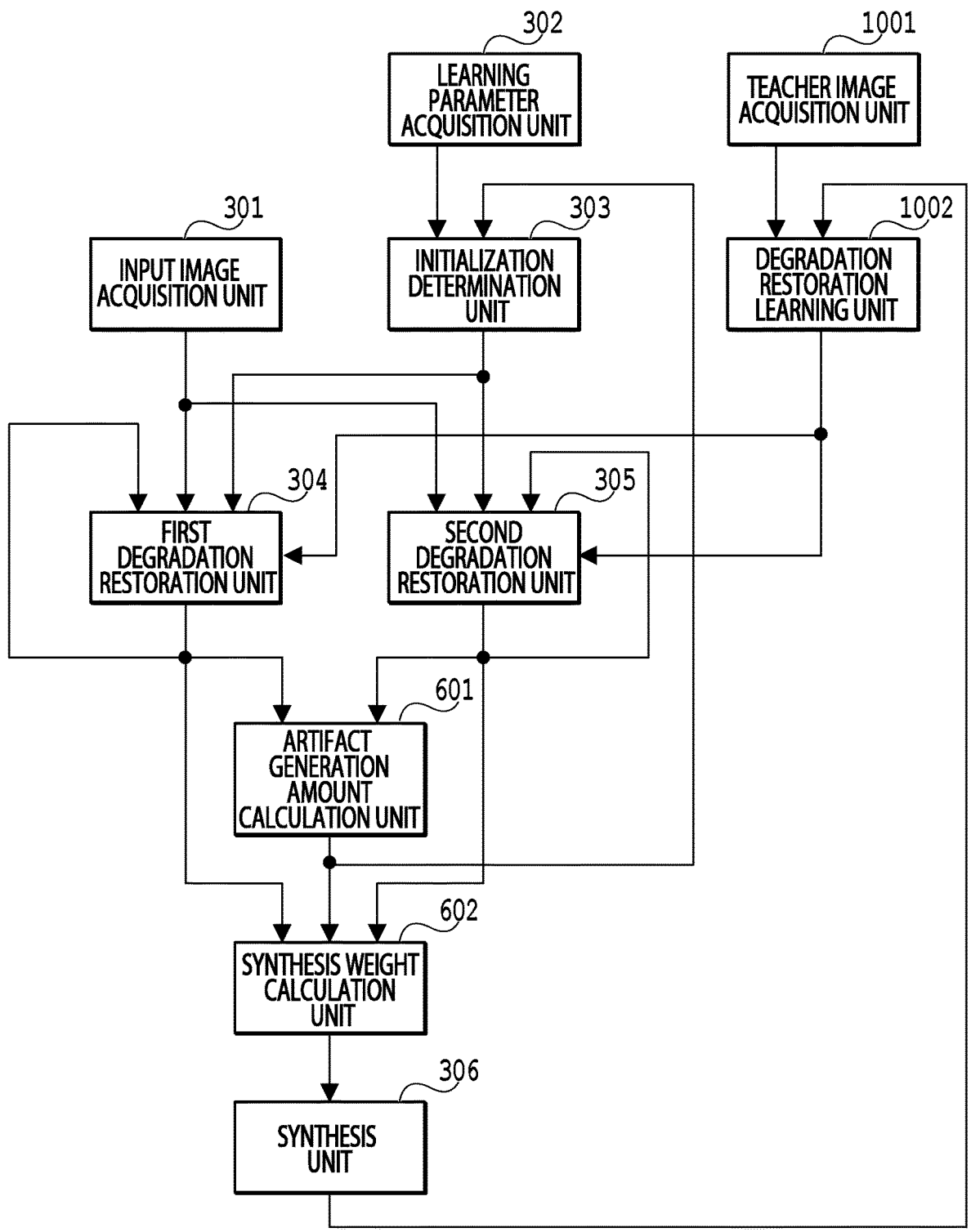
FIG. 10 is a functional block diagram of the edge device in the image processing system according to a third embodiment.
Figure 11B:
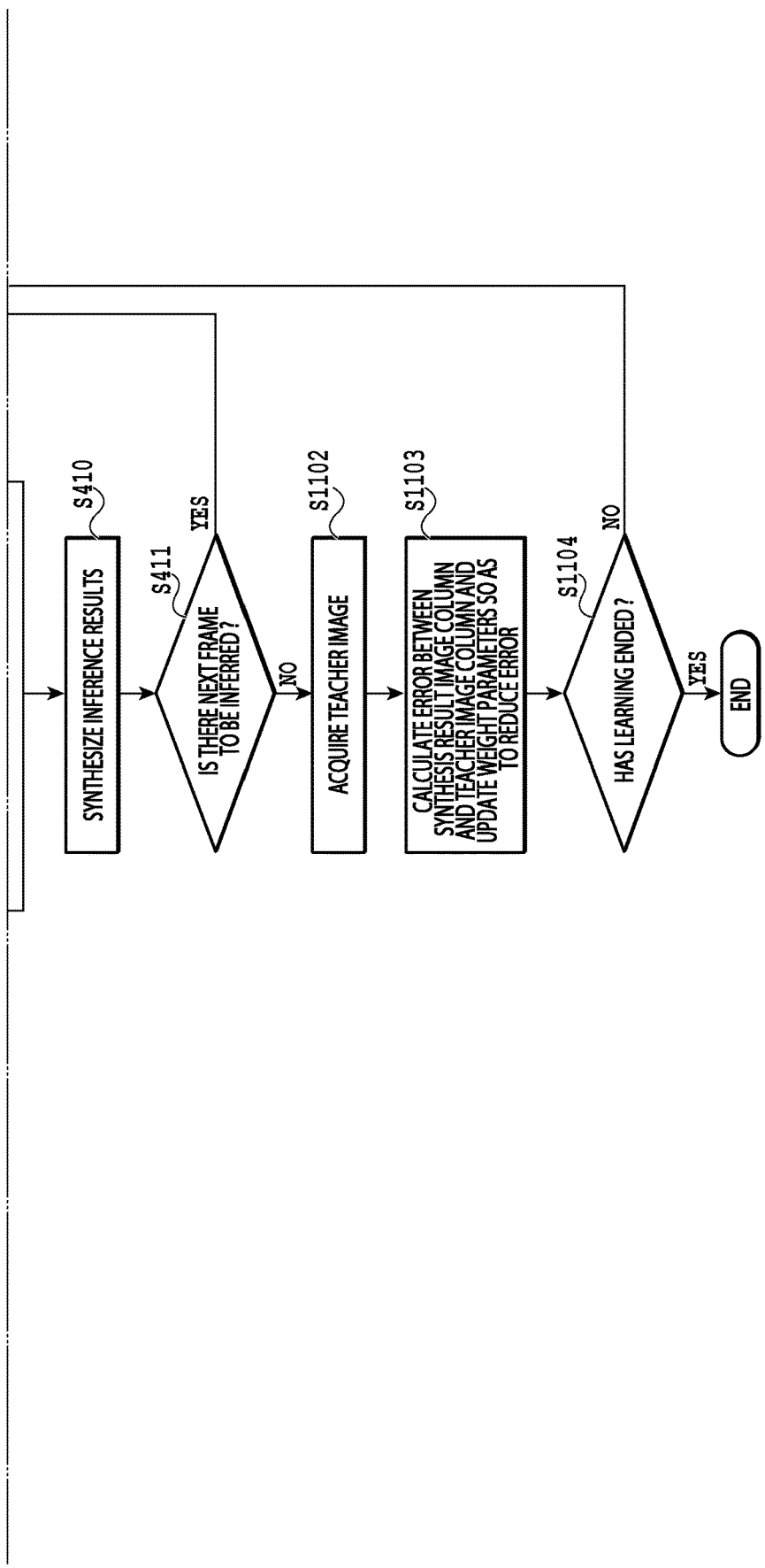
FIG. 11B is a flowchart of processing in the edge device in the image processing system according to the third embodiment.

FIG. 10 shows a functional block diagram of the image processing system according to the present embodiment. FIG. 11 shows a flowchart of processing of the image processing system according to the present embodiment. It should be noted that descriptions of the contents identical to those in the first and second embodiments, such as the basic configuration of the image processing system, will be omitted, and differences will be mainly described below.

In S1101, the first degradation restoration unit 304 and the second degradation restoration unit 305 initialize the weight parameters of the image restoration network 113 according to random numbers, and the process proceeds to S401.

In S1102, a teacher image acquisition unit 1001 acquires a teacher image column (a plurality of teacher images) corresponding to an input image column (a plurality of pieces of input image data). A teacher image is an image that is a correct answer in a case where the input image data is super-resolution-processed. The teacher image column is acquired from the imaging device 10, the RAM 102, or the external storage device 30. The acquired teacher image column is output to the first degradation restoration unit 304 and the second degradation restoration unit 305.

In S1103, a degradation restoration learning unit 1002 updates the weight parameters of the image restoration network 113 based on the teacher image column acquired from the teacher image acquisition unit 1001 and an image column of output results acquired from the synthesis unit 306. Specifically, an error between an image obtained by synthesizing results of two inferences about an i-th frame of the input image column and the teacher image is calculated to obtain a loss function L from the error according to Formula (3). The weight parameters of the image restoration network 113 of the first degradation restoration unit 304 and the second degradation restoration unit 305 are updated according to Formula (4) so as to minimize the loss function L.

In S1104, whether to continue learning is determined. In a case where the learning is to be continued, the process returns to S401 to continue updating the weight parameters. In a case where the given number of times of updates is achieved or the error is equal to or less than a given value, the learning is finished.

It should be noted that in S402 after the image restoration network 113 is learned in S1103, the learning parameter acquisition unit 302 acquires, from the degradation restoration learning unit 1002, learning parameters in a case where the image restoration network 113 is learned.

According to the present embodiment, updating the weight parameters of the image restoration network 113 of the first degradation restoration unit 304 and the second degradation restoration unit 305 makes it possible to obtain the image restoration network 113 in which artifacts are less likely to increase over a long period of time. As a result, the number of times of initialization can be suppressed, so that it is possible to further suppress the risk of abrupt switching between output images in a case where recurrent information is initialized. In the present embodiment, although it takes time to update the weight parameters of the image restoration network 113, it is possible to more stably reduce the amount of artifacts in a final output image.

First Modified Example

In the second embodiment, the method of determining a frame in which an inference is made using initialized recurrent information based on the amount of artifacts of an inference result has been shown. However, the frame in which an inference is made using initialized recurrent information may be determined based on the accuracy of a specific region of the inference result. As a result, it is possible to obtain an inference result in which degradation is rolled-back only in a specific region of input image data.

Figure 8C:
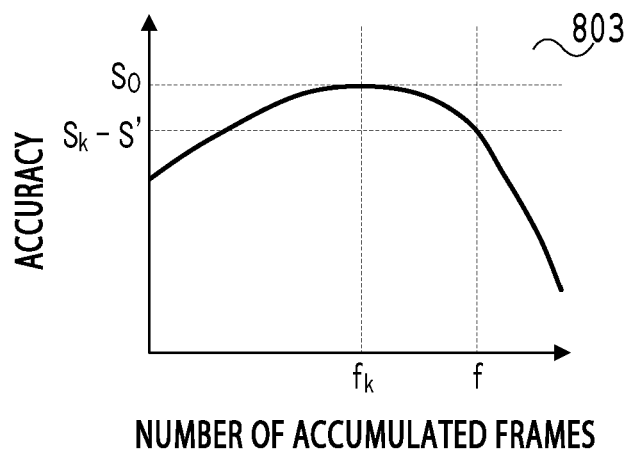
FIG. 8C is a diagram for explaining the initialization determination based on the evaluation of the amount of artifacts.

First, as a preliminary process, a pair of an input image sequence and a correct image sequence is prepared, a peak signal-to-noise ratio (PSNR) between an inference result not to be initialized and correct image data is calculated, and the inference accuracy s of a specific region is calculated by comparing them. FIG. 8C shows a graph 803 in which the inference accuracy s for each number of accumulated frames is recorded with respect to the number of accumulated frames f after recurrent information is initialized. The inference accuracy at this time is calculated for a plurality of frames and taken as the average value thereof. In general, the inference accuracy s in super-resolution processing reaches $s_k$ and is the highest at the time of the number of accumulated frames f reaching the learning sequence length $f_k$. Thus, the number of accumulated frames f where the inference accuracy s is below $s_k$–s' after $f_k$ is defined as the number of initialization preparation frames p, and it is determined that initialization is performed for each number of initialization preparation frames p in the first degradation restoration unit 304 and the second degradation restoration unit 305. Here, s' is a predetermined value set arbitrarily.

Information determined in advance on the number p of initialization preparation frames p is output to a storage medium and read again into the initialization determination unit 303 at the time of the present inference.

Second Modified Example

In the first to third embodiments, two super-resolution processes are performed in parallel in the first degradation restoration unit 304 and the second degradation restoration unit 305. However, it is not always necessary to apply two super-resolution processes to the same frame, and there may be a frame in which only one of the two super-resolution processes is performed. However, a frame group processed by the first degradation restoration unit 304 and a frame group processed by the second degradation restoration unit 305 at least partially overlap.

Figure 9A:
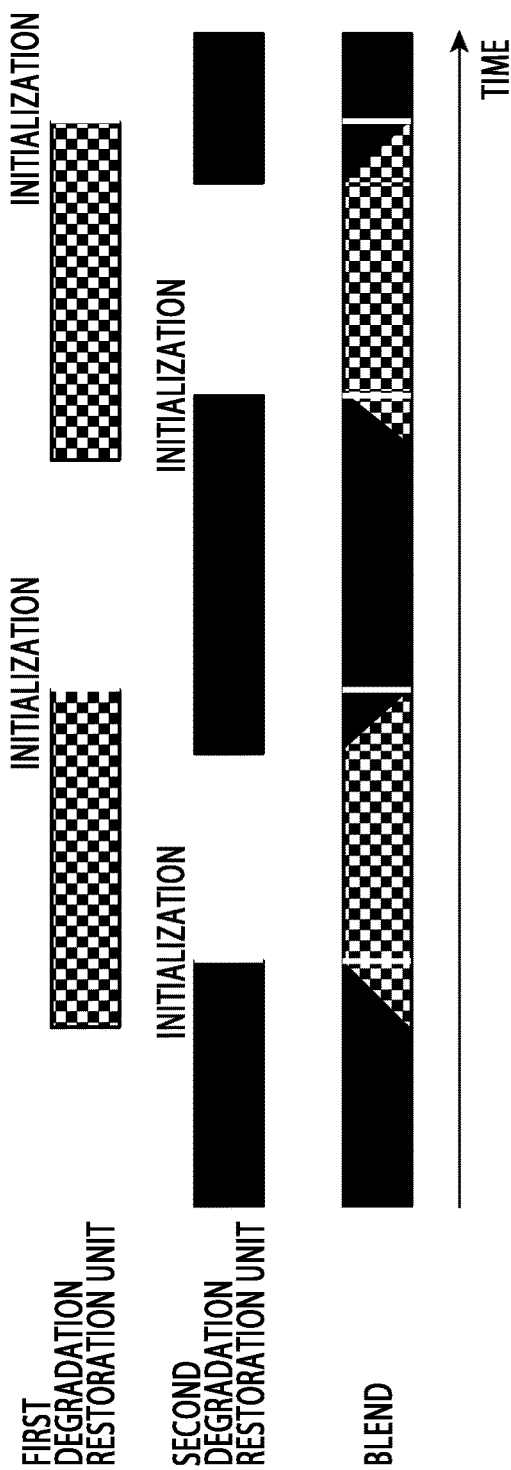
FIG. 9A is a diagram for explaining processes of initializing recurrent information and synthesizing inference results according to a modified example.
Figure 9B:
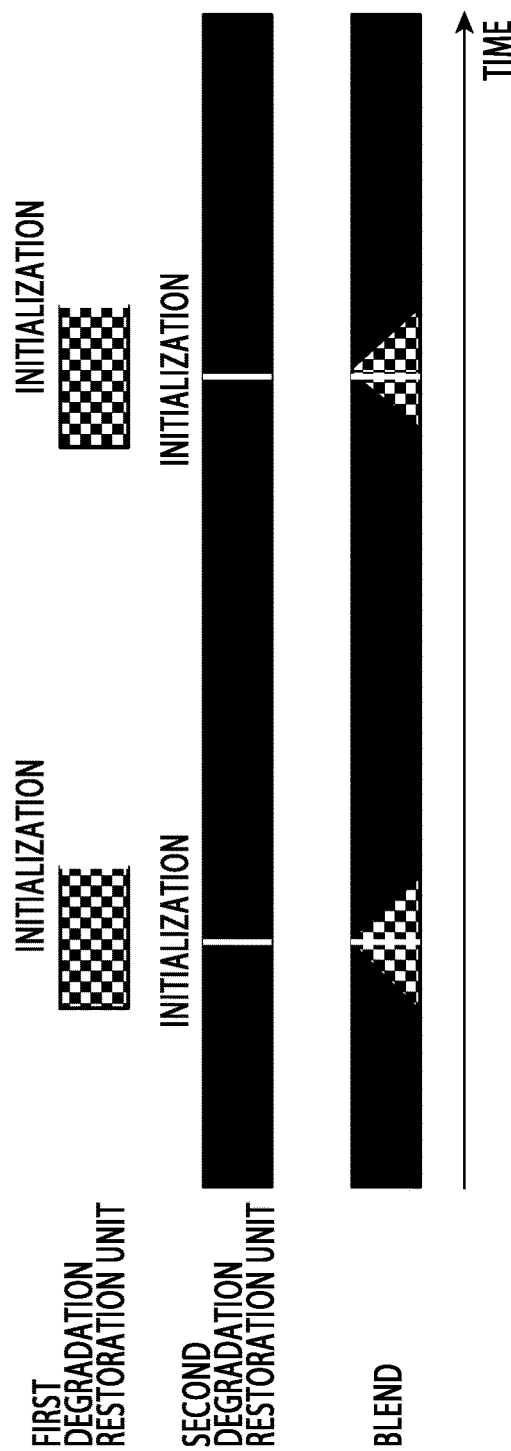
FIG. 9B is a diagram for explaining processes of initializing recurrent information and synthesizing inference results according to the modified example.

Specifically, as shown in FIG. 9A, the first degradation restoration unit 304 and the second degradation restoration unit 305 make an inference in parallel only in a few predetermined frames before and after the frame in which an inference is made using initialized recurrent information. In the other frames, only one of the first degradation restoration unit 304 and the second degradation restoration unit 305 makes an inference. Further, as shown in FIG. 9B, usually only one of the first image restoration unit 304 and the second image restoration unit 305 makes an inference, and both of them make an inference only in a few frames before and after the frame in which an inference is made using the initialized recurrent information. This makes it possible to reduce the amount of calculation for inference processing.

Third Modified Example

In the first to third embodiments, the examples in which super-resolution processing is performed as image restoration processing have been described. However, the present disclosure is also applicable to image restoration processing other than the super-resolution processing. For example, noise reduction processing can be performed instead of the super-resolution processing. The noise reduction processing can be carried out by changing some constituents in the first to third embodiments as follows.

First, the image restoration network 113 of the first degradation restoration unit 304 and the second degradation restoration unit 305 is changed to a CNN or CRNN that has learned to output a noise reduction processing result.

The artifact generation amount calculation unit 601 calculates an evaluation value for evaluating how many artifacts of the production of excessive noise reduction effects and the disappearance of the texture of input image data occur in the result of noise reduction processing. Specifically, the larger the amount of decrease in the amount of high-frequency components with respect to a reference frame is, the larger the amount of artifacts is evaluated to be. The amount of decrease in the amount of high-frequency components is calculated as the evaluation values of the two degradation restoration units 304 and 305. The evaluation value of an inference result output by a degradation restoration unit in which next initialization is to be performed and the evaluation value of an inference result output by the other degradation restoration unit are substituted into $s_0$ and $s_1$ of Formula (7) to calculate weights, and a result obtained by weighting and synthesizing the inference results made by the degradation restoration units 304 and 305 with the weights is a final output.

According to the present modified example, in noise reduction processing, it is possible to reduce the amount of artifacts and obtain inference results having temporal continuity without a sudden change in the degree of sub-limit of an image due to the influence of initialization.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the technique of the present disclosure, it is possible to make an appropriate inference using a recurrent neural network in image restoration processing.

This application claims the benefit of Japanese Patent Application No. 2022-172695, filed Oct. 27, 2022, which is hereby incorporated by reference wherein in its entirety.

The invention claimed is:

1. An image processing apparatus comprising:
    an image acquisition unit configured to acquire input image data including a plurality of frames;
    a first inference unit configured to output an inference result using a first learned recurrent type neural network for a first frame group which is at least a portion of the plurality of frames;
    a second inference unit different from the first inference unit and configured to output an inference result using a second learned recurrent type neural network for a second frame group which is a frame group of at least a portion of the plurality of frames and at least a portion of which overlaps the first frame group;
    a synthesizer configured to synthesize two inference results about an identical frame output from the first inference unit and the second inference unit; and
    an initialization unit configured to initialize recurrent information on the first learned recurrent type neural network and the second learned recurrent type neural network,
    wherein frames in which an inference is made using the recurrent information initialized by the initialization unit are different between the first inference unit and the second inference unit.

2. The image processing apparatus according to claim 1, wherein
    the first inference unit and the second inference unit output an inference result for a plurality of frames continued in a frame in which an inference is made using the initialized recurrent information, and
    the synthesizer decreases a synthesis ratio of an inference result in which the initialized recurrent information is greatly affected of the two inference results for the identical frame.

3. The image processing apparatus according to claim 2, wherein
    the synthesizer evaluates a magnitude of an influence of the initialized recurrent information on the inference result based on a number of frames on which the inference result depends.

4. The image processing apparatus according to claim 1, wherein
    the first inference unit and the second inference unit output, to one frame of the plurality of frames, an inference result based on recurrent information which is an inference result about a frame immediately preceding the one frame, and the inference result based on the initialized recurrent information which is predetermined initial image data different from the inference result about the immediately preceding frame.

5. The image processing apparatus according to claim 1, further comprising:
a calculation unit configured to calculate an amount of artifacts included in the inference results output by the first inference unit and the second inference unit,
wherein the initialization unit determines a frame in which an inference is made using the initialized recurrent information based on the amount of artifacts.

6. The image processing apparatus according to claim 5, wherein
the calculation unit calculates the amount of artifacts included in image data which is the inference result.

7. The image processing apparatus according to claim 5, wherein
the calculation unit calculates the amount of artifacts based on a number of frames on which the inference result depends.

8. The image processing apparatus according to claim 5, wherein
the synthesizer determines a synthesis ratio of two inference results about the identical frame based on the amount of artifacts.

9. The image processing apparatus according to claim 5, further comprising:
a learning parameter acquisition unit configured to acquire a learning parameter used to learn the first learned recurrent type neural network and the second learned recurrent type neural network,
wherein the calculation unit calculates the amount of artifacts based on the learning parameter.

10. The image processing apparatus according to claim 9, wherein
the initialization unit determines a frame in which an inference is made using the initialized recurrent information based on a difference between the latest amount of artifacts and an amount of artifacts calculated based on the learning parameter.

11. The image processing apparatus according to claim 9, wherein
the learning parameter is a learning sequence length representing a number of frames of image data used for learning.

12. The image processing apparatus according to claim 1, further comprising:
a learning parameter acquisition unit configured to acquire a learning parameter used to learn the first learned recurrent type neural network and the second learned recurrent type neural network,
wherein the initialization unit determines a frame in which an inference is made using the initialized recurrent information based on the learning parameter.

13. The image processing apparatus according to claim 1, further comprising:
a teacher image acquisition unit configured to acquire correct image data corresponding to the input image data; and
a learning unit configured to learn so as to reduce an error between an output result output by the synthesizer and the correct image data.

14. The image processing apparatus according to claim 1, wherein
the first inference unit and the second inference unit are images in which image degradation due to at least one of low resolution, blur, noise, compression, color decimation, fog/haze/rain/snow, an aberration, and a defect is reduced in the input image data.

15. The image processing apparatus according to claim 1, wherein
the first learned recurrent type neural network and the second learned recurrent type neural network are substantially identical to each other.

16. An image processing method comprising:
an image acquisition step of acquiring input image data including a plurality of frames;
a first inference step of outputting an inference result using a first learned recurrent type neural network for a first frame group which is at least a portion of the plurality of frames,
a second inference step of outputting an inference result using a second learned recurrent type neural network for a second frame group which is a frame group of at least a portion of the plurality of frames and at least a portion of which overlaps the first frame group, the second inference step being different from the first inference step;
a synthesis step of synthesizing two inference results about an identical frame output in the first inference step and the second inference step; and
an initialization step of initializing recurrent information on the first learned recurrent type neural network and the second learned recurrent type neural network,
wherein frames in which an inference is made using the recurrent information initialized by the initialization step are different between the first inference step and the second inference step.

17. A non-transitory computer readable storage medium storing a program that causes a computer to execute an image processing method comprising:
an image acquisition step of acquiring input image data including a plurality of frames;
a first inference step of outputting an inference result using a first learned recurrent type neural network for a first frame group which is at least a portion of the plurality of frames,
a second inference step of outputting an inference result using a second learned recurrent type neural network for a second frame group which is a frame group of at least a portion of the plurality of frames and at least a portion of which overlaps the first frame group, the second inference step being different from the first inference step;
a synthesis step of synthesizing two inference results about an identical frame output in the first inference step and the second inference step; and
an initialization step of initializing recurrent information on the first learned recurrent type neural network and the second learned recurrent type neural network,
wherein frames in which an inference is made using the recurrent information initialized by the initialization step are different between the first inference step and the second inference step.

* * * * *